United States Patent
Terada et al.

[15] 3,700,753
[45] Oct. 24, 1972

[54] POLYMER COMPOSITIONS COMPRISING POLYETHYLENE AND ETHYLENE/PROPYLENE COPOLYMER

[72] Inventors: Hiroshi Terada; Kenzo Shirayama, both of Niihama, Japan

[73] Assignee: Sumitomo Chemical Company, Ltd., Osaka, Japan

[22] Filed: Sept. 8, 1970

[21] Appl. No.: 70,579

Related U.S. Application Data

[63] Continuation-in-part of Ser. No. 735,573, June 10, 1968, abandoned.

[30] Foreign Application Priority Data

June 28, 1967 Japan ......................42/41829

[52] U.S. Cl. .........260/876 B, 117/128.4, 260/897 A
[51] Int. Cl. .............................................C08f 29/12
[58] Field of Search ......................260/897 A, 876 B

[56] References Cited

UNITED STATES PATENTS 3,328,486   6/1967   Crawford et al...........260/876
3,250,825   5/1966   Martinovich..............260/897

FOREIGN PATENTS OR APPLICATIONS 1,117,632   6/1968   Great Britain.............260/876
 927,881    6/1963   Great Britain.............260/897
1,452,469   9/1966   France......................260/876

*Primary Examiner*—Murray Tillman
*Assistant Examiner*—C. J. Seccuro
*Attorney*—Stevens, Davis, Miller & Mosher

[57] ABSTRACT

A polymer composition consisting of 70–99.5 percent by weight of low density polyethylene having a density of 0.940 or less and 0.5–30 percent by weight of a substantially amorphous propylene-ethylene copolymer having an ethylene content of 20 percent by weight or less, an intrinsic viscosity in tetralin at 135° C. in the range of 1.0–2.8 and a crystallinity of 35 percent by weight or less according to ordinary X-ray analysis.

This composition improves the high speed processability of the low density polyethylene.

5 Claims, No Drawings

POLYMER COMPOSITIONS COMPRISING POLYETHYLENE AND ETHYLENE/PROPYLENE COPOLYMER

CROSS-REFERENCES TO PATENTED APPLICATIONS:

This is a continuation-in-part of application Ser. No. 735,573 filed June 10, 1968 now abandoned.

This invention relates to a polymer composition which has improved the processability of low density polyethylene. More particularly, the invention pertains to a polymer composition having high speed processability which contains low density polyethylene and a substantially amorphous ethylene-propylene copolymer.

By virtue of its excellent properties, polyethylene has been used in various fields as shaped articles such as films, sheets, pipes and fibers, and as electric wire coatings. In order to further improve the properties thereof, however, various processes have been attempted. Low density polyethylene prepared according to high pressure polymerization process is excellent in properties as compared with high density polyethylene, polypropylene and other $\alpha$-olefin polymers prepared according to medium or low pressure polymerization process. However, said low density polyethylene has no properties so sufficient as to be suitable for the high speed of processing machines, which have rapidly progressed in recent years. On the other hand, the necessity of high speed processability has become great more and more. Particularly, in the case of electric wire insulation coating, a processing speed of 5,000 ft./min. is required according to J. N. Scott, C. T. Levette, C. F. Leslie et al.: "Tailoring of High Density Polyethylene for High Speed Wire Coating," The 14th Wire & Cable Symposium. Thus, the processability and melt flow properties inherent to low density polyethylene prepared according to high pressure polymerization process is not always sufficient.

In order to improve the processability, melt flow properties, environmental stress crack resistance and the like physical properties owned by said low density polyethylene, many efforts have already been made. For example, Japanese Pat. Publication No. 17410/1964, British Pat. No. 1,032,728 and Dutch Pat. No. 6610590 teach processes in which high density polyethylene is incorporated into low density polyethylene; Dutch Pat. No. 6610590 discloses a process in which crystalline polypropylene is incorporated; Japanese Pat. Publication No. 22,351/1964 discloses a process in which a crystalline $\alpha$-olefin polymer is incorporated; Japanese Pat. Publication No. 21,210/1963, German Pat. No. 1,137,859, British Pat. No. 1,117,631, No. 1,117,632 and French Pat. No. 1,452,469 disclose processes in which is added to low density polyethylene a crystalline ethylene-propylene copolymer, an ethylenepropylene block copolymer, or a crystalline copolymer of ethylene or propylene and an $\alpha$-olefin having four or more carbon atoms; Japanese Pat. Publication No. 20,266/1965, British Pat. No. 927,881, No, 1,037,820, and U.S. Pat. No. 3,261,889 teach processes in which an ethylene propylene rubber, an ethylene-propylene terpolymer, an atactic polypropylene or an atactic ethylene-propylene copolymer is added; Japanese Pat. Publication No. 14,625/1962 discloses a process in which polypropylene wax is incorporated; British Pat. No. 960,311 teaches a process in which polyisobutylene, polystyrene or the like is mixed with low density polyethylene and the mixture is heated; and there is a process in which two or more of the above-mentioned polymers are added to and kneaded with low density polyethylene.

However, the process in which low density polyethylene is incorporated and kneaded with high density polyethylene, polypropylene or homopolymers or copolymers of other $\alpha$-olefins, or with a crystalline polymers such as block copolymers, has such drawbacks as mentioned below.

The high density polyethylene or the like polymer, which has been incorporated into low density polyethylene, is less in compatibility, and therefore when the resulting mixture after kneading is microscopically observed, the polymer has not been uniformly dispersed in the polyethylene. Accordingly, the mixture is low in tensile strength and elongation, and should be extruded under higher extrusion pressure.

On the other hand, the process in which the low density polyethylene is incorporated with a rubbery copolymer of $\alpha$-olefins composed mainly of ethylene or propylene, is desirable for the improvement of low density polyethylene in environmental stress crack resistance. This process, however, is not satisfactory for the improvement of low density polyethylene in high speed processability. A composition obtained according to the above process is high in viscosity, in general, and is not suitable for the attainment of favorable extrudability. Even if the composition obtained by the above process is low in viscosity, it gives no extrudate excellent in surface smoothness.

As mentioned above, known processes are not satisfactory for the improvement of high speed processability of low density polyethylene. The term "high speed processability" in this invention means a property that even in the case of super high speed process such as electric wire insulation coating process, extruding pressure is low and surface of product is very smooth as in the case of ordinary process for producing shaped articles such as films, sheets, pipes and fibers.

Generally, in electric wire coating, the electric wire to be coated with a composition becomes greater in elongation with increasing pressure of extrusion of the composition, with increasing processing speed, and with decreasing diameter of the core wire, whereby the core wire is hardened during processing. As the result, there are brought about such drawbacks that the allowance, which is necessary in the subsequent twisting and aggregating steps, becomes smaller and, in some cases, the wire is undesirably cut.

The present inventors studied to improve high speed processability of low density polyethylene. As a result the present inventors have found that high speed processability of low density polyethylene is improved by incorporating a substantially amorphous propyleneethylene copolymer by-produced in the production of a crystalline ethylene-propylene copolymer or a crystalline propylene-ethylene block copolymer by use of a catalyst comprising a titanium halide and an alkylaluminum compound into the low density polyethylene.

An object of the present invention is to provide a polymer composition for improving the high speed processability of low density polyethylene and a process for producing the same.

Other object will be apparent from the following descriptions.

The present invention provides a polymer composition essentially consisting of (1) 70–99.5 percent by weight of low density polyethylene having a density of 0.940 or less and (2) 0.5–30 percent by weight of a substantially amorphous propylene-ethylene copolymer having an ethylene content of 20 percent by weight or less, an intrinsic viscosity in tetralin at 135° C, in the range of 1.0 to 2.8 and a crystallinity of 35 percent by weight or less according to ordinary X-ray analysis, by-produced as a polymerization medium-soluble component in the production of crystalline propylene-ethylene copolymer or crystalline propylethylene block copolymer, which are composed mainly of propylene, by use of a catalyst comprising a titanium halide and an alkylaluminum.

The low density polyethylene, which is one component of the present invention, has a density of 0.940 or less, preferably 0.917–0.940, and a melt index of 0.1–5.0, and is substantially a homopolymer prepared in the following manner: Ethylene, or a mixture of ethylene and small amount of such a comonomer as vinyl acetate or ethyl acrylate, is polymerized in a tublar reactor or autoclave-type reactor at 50°–300° C under 500–4,000 atm. in the presence of catalysts such as oxygen, organic peroxides, or azo compounds.

The other component constituting the present composition is substantially hydrocarbon-soluble amorphous propylene-ethylene copolymer as defined below. The amorphous ethylene-propylene copolymer is a substantially hydrocarbon-soluble copolymer obtained in such a manner that in order to prepare a crystalline ethylene-propylene copolymer or a crystalline ethylenepropylene block copolymer which is composed mainly of propylene, ethylene is copolymerized with propylene in a n-hydrocarbon solvent in the presence of catalyst such as a titanium halide, e.g. $3TiCl_3 \cdot 3$, and an alkyl-aluminum compound, e.g. $AlEt_2Cl$, the reaction product is freed from suspended solids, and then said copolymer is recovered from the residual hydrocarbon solution. This amorphous copolymer is a copolymer having an ethylene content of 20 percent by weight or less, an intrinsic viscosity in tetralin at 135° C in the range of 1.0–2.8 and a crystallinity of 35 percent by weight or less according to ordinary X-ray analysis and containing 0.05 to 0.3 percent by weight of ethylenic unsaturation. The amorphous copolymers having an ethylene content of more than 20 percent by weight, an intrinsic viscosity in tetralin at 135° C of less than 1.0 may also be obtained by other processes, but these copolymers are not so effective as those of present invention.

The present composition shows excellent high speed processability when it is prepared by adding to low density polyethylene, 0.5–30 percent by weight of said amorphous propylene-ethylene copolymer. Particularly when the amount of said additive is 1–10 percent by weight, there is obtained a composition which can be extruded under a low pressure and which can form a smooth surface.

In the case of electric wire insulation coating, it is preferable to adopt a process in which, after coating, the composition is cross-linked by application of an organic peroxide or electron rays, thereby curing the surface thereof. Particularly when the amorphous propylene-ethylene copolymer is added in large amount, excellent properties can be imparted to the present composition.

In preparing the present composition, the individual components may be kneaded according to any of the conventional procedures using Banbury mixers, roll kneaders or screw extruders.

The polymer compositions of the present invention can be used for various purposes by incorporating therein, like in the case of common polymers, suitable amounts of various conventional stabilizers, copper inhibitor, fillers, reinforcing agents, resins or foaming agents, and coloring agents such as pigments.

According to the present invention, high speed processability of polyethylene is remarkably improved. For example, it becomes possible to make polyethylene-covered electric wires at a super high speed by using the polymer composition of the present invention.

The amorphous propylene-ethylene copolymer used in the present invention is a by-product in the production of crystalline propylene-ethylene copolymer or crystalline propylene-ethylene block copolymer which are composed mainly of propylene. The present invention gives such by-product a good use.

These are advantages of the present invention.

The effects of the present invention are illustrated in detail below with reference to examples, but the examples are merely illustrative and by no means limit the scope of the invention.

In each of the examples shown later, the processability of the present polymer composition was tested under such markedly severe conditions as mentioned below.

A die having a diameter of 0.6 mm was attached to a screw extruder having a diameter of 50 mm and an effective length to effective diameter ratio of 20. A polymer composition was extruded from the extruder and was coated around a copper wire of 0.4 mm in diameter, while passing the copper wire through the die at a definite high linear velocity. The processability of the composition was evaluated according to various measuring procedures, e.g. such procedures as the measurement of the pressure inside the die when the composition was extruded from the extruder; the visual observation and feeling of the resulting coated wire surface; the measurement of the surface roughness by use of a surface Roughness Tester (manufactured by Tokyo Seimitsu Co., Ltd.); and the optical observation of the surface by means of a microscope of 300 magnifications. Further, the physical properties of the polymer composition after coating the wire were measured after drawing out the core wire from the coated electric wire.

The physical properties of the compositions shown in the examples were measured according to ordinary procedures. That is, the melt index was measured according to JIS K 6760–1966, the density was measured according to density-gradient tube method (at 20° C) of JIS K 6760—1966, the intrinsic viscosity $[\eta]$ was measured in tetraline solution at 135° C, and the ethylene concentration in the copolymer was measured according to infrared spectrophotometry. Further, all the percentages are by weight. The elongation was measured according to JIS K 6761—1962. The state of the coated surface was represented by Ha (mean deviation from center line) in a unit of micron ($\mu$). The abrasion resistance strength was measured in such a manner that a definite weight was attached to one end of the coated wire and the wire was laid on a metal-made horizontal drum and was abraded by rotating the drum, and the value of abrasion resistance strength was represented by the rotation number of the drum until the coating had been broken.

EXAMPLE 1

As one component was used low density polyethylene having a melt index of 0.22 g/10 min. as the other component was used a hot n-heptane-soluble ethylene-propylene copolymer ($[\eta]$ = 2.5; ethylene content: 15 percent by weight; ethylenic unsaturation: 0.14 percent by weight), which was by-produced in producing, in an n-heptane solvent in the presence of a $3TiCl_3 \cdot_3$ — $AlEt_2Cl$ catalyst system, a crystalline polymer in such a form that an ethylene-propylene random copolymer had been block-copolymerized with a polypropylene chain (83 percent based on the block copolymer). The latter component had been incorporated with 0.1 percent of 1,1,3-tris-(2-methyl-5-tert-butyl-4-hydroxyphenyl)-butane. The two components were charged in proportions as shown in Table 1 into an 0-type Banbury mixer and were kneaded each other at 135° C for 7 minutes. After kneading, the resulting composition was pelletized by means of an ordinary granulator. Subsequently, the granular composition was subjected to the aforesaid screw extruder to effect tests for coating a copper wire at a high linear velocity. The results were as shown in Table 1.

TABLE 1

| | Composition (% by weight) | | | |
|---|---|---|---|---|
| Run No. | Poly-ethylene | Hot n-heptane Soluble ethylene-propylene copolymer | Extrusion pressure (kg/cm²) | Surface roughness ($\mu$, Ha) |
| 1 | 100 | 0 | 396 | 1.8 –2.5 |
| 2 | 99.5 | 0.5 | 385 | 0.55–0.65 |
| 3 | 99.0 | 1.0 | 380 | 0.37–0.52 |
| 4 | 97.0 | 3.0 | 378 | 0.20–0.22 |
| 5 | 90.0 | 10.0 | 351 | 0.11–0.14 |
| 6 | 80.0 | 20.0 | 310 | 0.18–0.25 |

EXAMPLE 2

As one component was used low density polyethylene having a melt index of 0.24 g/10 min. and a density of 0.924. As the other component was used a hot n-heptane-soluble ethylene-propylene copolymer ($[\eta]$ = 2.2; ethylene content: 8 percent by weight; ethylenic unsaturation: 0.09 percent by weight), which was by-produced in producing, in an n-heptane solvent in the presence of a $3TiCl_3 \cdot AlCl_3$—$AlEt_2Cl$ catalyst, a polymer in such a form that an ethylene-propylene random copolymer had been block-copolymerized with a polypropylene chain (83 percent based on the block copolymer). The two components were kneaded together so that the amount of the copolymer became 3 percent by weight based on the weight of the resulting composition. Subsequently, the composition was granulated and then subjected to coating test in the same manner as in Example 1.

For comparison, the above-mentioned low density polyethylene was kneaded with each of isotactic polypropylene, high density polyethylene and ethylene-propylene ternary copolymer so that the amount of the latter became 3 percent by weight based on the weight of the resulting composition. The thus obtained compositions were granulated and then subjected to coating tests in the same manner as in Example 1. Further, the elongation of coatings, the elongation of core wires, and the abrasion resistance strength of coating wires were measured according to the procedures set forth in the body. The results were as shown in Table 2.

TABLE 2

| | | Polymer added to low density polyethylene (control) | | |
|---|---|---|---|---|
| | present composition | poly-propylene | high density poly-ethylene | ethylene-propylene ternary c-o-polymer |
| Melt index (g/10 min.) | 0.38 | 0.37 | 0.35 | 0.31 |
| Density (g/cc, at 20°C) | 0.921 | 0.922 | 0.924 | 0.921 |
| Extrusion pressure (kg/cm²) | 380 | 457 | 384 | 455 |
| Surface roughness ($\mu$, Ha) | 0.22–0.30 | 0.5–0.6 | 0.9–1.4 | 2.3–3.0 |
| Elongation of coating (%) | 400 | 265 | 303 | 383 |
| Elongation of core wire (%) | 26 | 23 | — | — |
| Abrasion strength (at 50°C) | | | | |
| Load 50 g | 107 | 59 | 98 | 144 |
| Load 75 g | 37 | 20 | 61 | 28 |
| Load 100 g | 15 | 9 | 31 | 9 |

Table 2 shows that as the result of coating tests on the compositions incorporated individually with polypropylene, high density polyethylene, and ethylene-propylene ternary copolymer, said compositions are markedly inferior in smoothness of coated surface to the present compositions. The table further shows that the control compositions containing polypropylene and ethylene-propylene ternary copolymer require higher extrusion pressures than in the case of the present compositions. It is also clear that as compared with the present compositions, the conventional compositions are inferior in elongation of coatings and of core wires and have drawbacks in high speed processability.

EXAMPLE 3

As one component was used low density polyethylene having a melt index of 0.20 g/10 min. and a density of 0.924. As the other component was used a hot n-heptane-soluble ethylene-propylene copolymer ($[\eta]$: 1.98; ethylene content: 15.9 percent by weight; ethylenic unsaturation: 0.16 percent by weight), which was by-produced in producing, in an n-heptane solvent in the presence of a $3TiCl_3 \cdot AlCl_3$—$AlEt_2Cl$ catalyst, a polymer in such a form that an ethylene-propylene random copolymer has been block-copolymerized with a polypropylene chain (82 percent based on the block copolymer). The two components were kneaded together so that the amount of the copolymer became 3 percent by weight based on the weight of the resulting composition. Subsequently, the composition was granulated and then subjected to coating test in the same manner as in Example 1.

For comparison, the above-mentioned low density polyethylene was kneaded individually with each of the ethylene-propylene random copolymers which have ethylene contents of 63.2 percent and 37.4 percent by weight respectively. These copolymers were produced by copolymerizing ethylene-propylene mixture at 60° C in n-heptane with the catalysts of VOCl$_3$—AlEt$_2$Cl and 3TiCl$_3$·$_3$—AlEt$_2$Cl respectively. The amount of the ethylene-propylene copolymer was 3 percent by weight based on the weight of the resulting composition. Thus obtained compositions were granulated and then subjected to coating tests in the same manner as in Example 1. Further, the abrasion resistance strength of coating wires were measured according to the procedures set forth in the body. The results were as shown in Table 3.

Table 3 shows that as the result of coating tests on the compositions incorporated with ethylene-propylene random copolymers, which contain more than 20 percent by weight of ethylene unit said compositions are markedly inferior in smoothness of coated surface to the present compositions.

TABLE 3

| Properties of the Polymer Composition | Present composition | Control composition Case 1 | Case 2 |
|---|---|---|---|
| Ethylene-Propylene Copolymer | | | |
| Ethylene content (wt %) | 15.9 | 63.2 | 37.4 |
| Intrinsic viscosity in tetralin at 135°C [η] | 1.98 | 1.67 | 0.63 |
| Crystallinity (wt %) according to ordinary X-ray analysis | 28 | —* | —* |
| Ethylenic unsaturation (wt %) | 0.16 | | |
| Melt index | 0.41 | 0.40 | 0.39 |
| Extrusion pressure (kg/cm²) | 378 | 376 | 364 |
| Surface roughness (μ, Ha) | 0.15–0.20 | 0.8–0.9 | 1.4–1.8 |
| Abrasion resistance strength (at 50°C) | | | |
| Load 50 g | 125 | 86 | 76 |
| Load 75 g | 18 | 16 | 21 |
| Load 100 g | 9 | 11 | 9 |

* No crystalline peak was observed.

EXAMPLE 4

As one component was used low density polyethylene having a melt index of 0.20 g/10 min. and a density of 0.924. As the other component were used individually two hot n-heptane-soluble ethylene-propylene copolymers A and B (A: [η]: 1.30; ethylene content: 11.9 percent by weight; ethylenic unsaturation: 0.20 percent by weight, B: [η]: 0.81; ethylene content: 17.5 percent by weight; ethylenic unsaturation: 0.25 percent by weight), which were by-produced in producing, in an n-heptane solvent in the presence of a 3TiCl$_3$·AlCl$_3$—AlEt$_2$Cl catalyst, a polymer in such a form than an ethylene-propylene random copolymer had been block-copolymerized with a polypropylene chain (81–83 percent based on the block copolymer). The two components were kneaded together so that the amount of the copolymer became 3 percent by weight based on the weight of the resulting composition. Subsequently, the composition was granulated and then subjected to coating test in the same manner as in Example 3. The results were as shown in Table 4.

Table 4 shows that a copolymer having a low intrinsic viscosity has not enough effect on improvement of high-speed processability of low density polyethylene even if said copolymer is a heptane soluble portion which is produced as by-product in the production of ordinary crystalline propylene-ethylene copolymer.

TABLE 4

| Properties of the polymer composition | Present composition | Polymer Composition Control composition Case 3 |
|---|---|---|
| Ethylene-Propylene Copolymer | | |
| Ethylene content (wt %) | 11.9 | 17.5 |
| Intrinsic viscosity in tetralin at 135°C [η] | 1.30 | 0.81 |
| Crystallinity (wt %) according to ordinary X-ray analysis | 28 | 23 |
| Ethylenic unsaturation (wt %) | 0.20 | 0.25 |
| Melt index | 0.42 | 0.43 |
| Extrusion pressure (kg/cm²) | 373 | 368 |
| Surface roughness (μ, Ha) | 0.18–0.23 | 0.8–0.9 |

What is claimed is:

1. A polymer composition consisting essentially of (1) 70 – 99.5 percent by weight of low density polyethylene having a density of 0.940 or less and (2) 0.5 – 30 percent by weight of a substantially amorphous propylene-ethylene copolymer containing 0.05 to 0.3 percent by weight of ethylenic unsaturation and having an ethylene content of 20 percent by weight or less, an intrinsic viscosity in tetralin at 135° C in the range of 1.0 – 2.8 and a crystallinity of 35 percent by weight or less according to ordinary X-ray analysis and by-produced as a polymerization medium-soluble component in the production of crystalline propylene-ethylene block copolymer, which is composed mainly of propylene, by use of a catalyst comprising a titanium halide and an alkylaluminum.

2. A polymer composition according to claim 1, wherein the amount of said substantially amorphous propylene-ethylene copolymer is 1 – 10 percent by weight.

3. A polymer composition according to claim 1, wherein the polymerization medium is n-heptane.

4. Electric wire coated by a polymer composition consisting essentially of (1) 70 – 99.5 percent by weight of low density polyethylene having a density of 0.940 or less and (2) 0.5 – 30 percent by weight of a substantially amorphous propylene-ethylene copolymer containing 0.05 to 0.3 percent by weight of ethylenic unsaturation and having an ethylene content of 20 percent by weight or less, an intrinsic viscosity in tetralin at 135° C in the range of 1.0 – 2.8 and a crystallinity of 35 percent by weight or less according to ordinary X-ray analysis and by-produced as a polymerization medium-soluble component in the production of crystalline propylene-ethylene block copolymer, which is composed mainly of propylene, by use of a catalyst comprising a titanium halide and an alkylaluminum.

5. Electric wire coated by a polymer composition according to claim 4, wherein the polymer composition is cross-linked.

* * * * *